Feb. 8, 1949.　　　　　M. A. STICELBER　　　　2,461,450
REFRIGERATING MEANS FOR DOUGH MIXERS
Filed March 24, 1945　　　　　　　　　　2 Sheets-Sheet 1
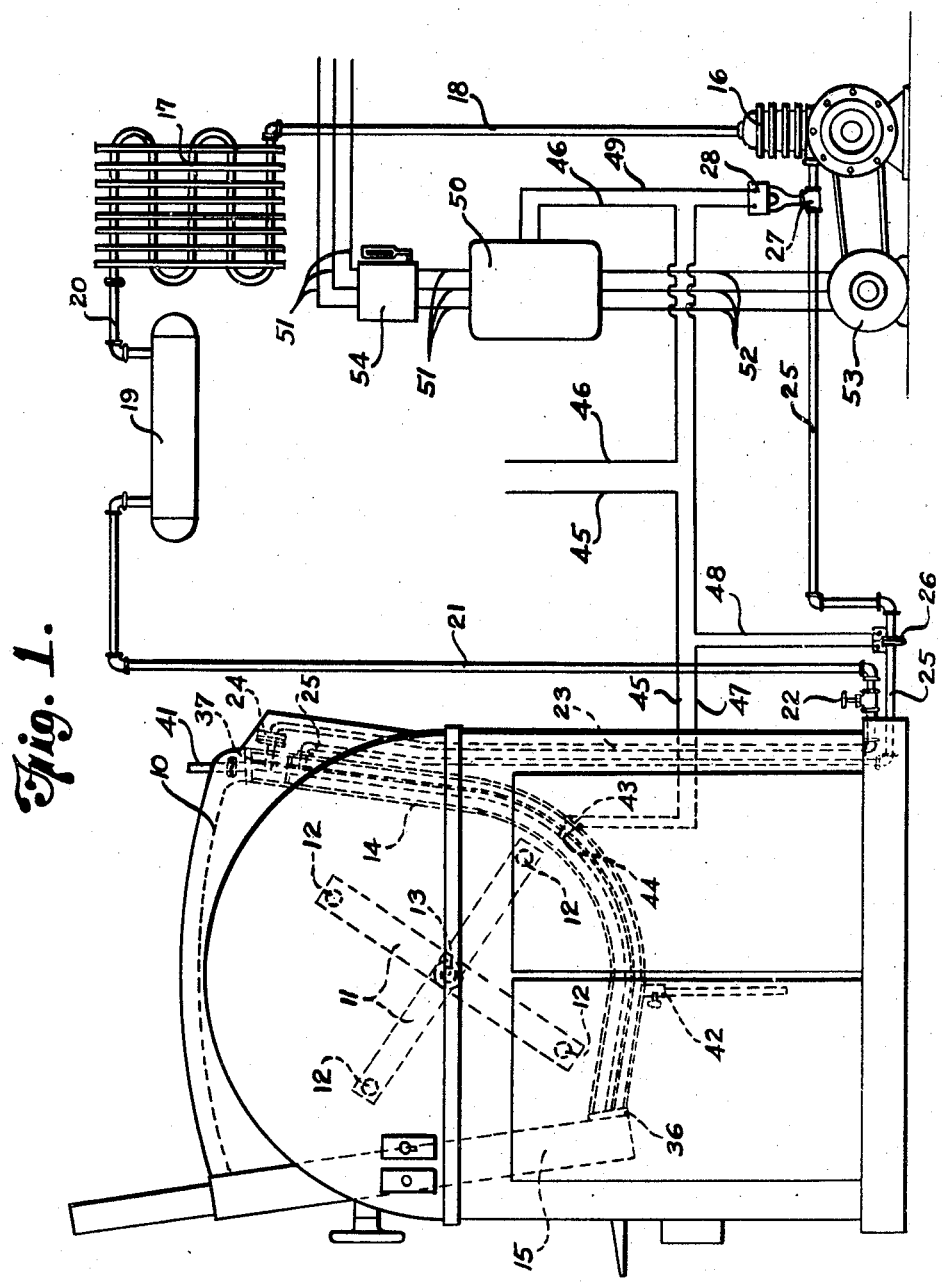
INVENTOR.
MERLIN A. STICELBER
BY Alfred R. Fuchs
ATTORNEY

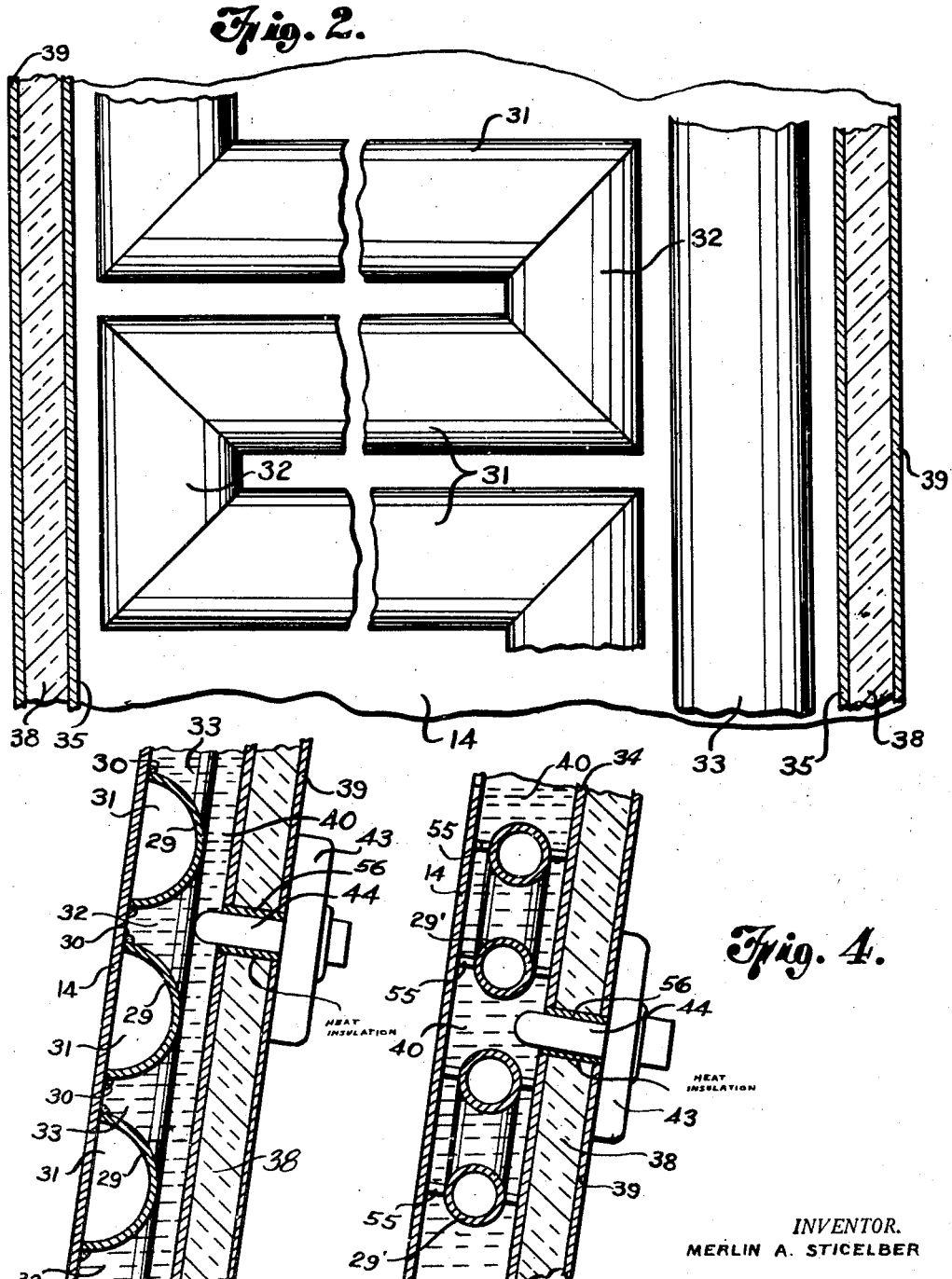

Patented Feb. 8, 1949

2,461,450

UNITED STATES PATENT OFFICE 2,461,450

REFRIGERATING MEANS FOR DOUGH MIXERS

Merlin A. Sticelber, Kansas City, Mo., assignor to Quik-Seal, Inc., a corporation of Missouri Application March 24, 1945, Serial No. 584,677

4 Claims. (Cl. 62—1)

My invention relates to dough mixers, and more particularly to refrigerating means for dough mixers.

It is a purpose of my invention to provide means for cooling the wall of a dough mixer, that is so constructed and arranged as to avoid the frequent cycling of the compressor that is experienced with direct expansion refrigerating means for dough mixer walls as existed prior to my present invention.

This is accomplished by providing temperature responsive controlling means in a heat transfer medium that is in heat transfer relation both to a direct expansion refrigerating coil and the wall of the dough mixer that is to be cooled. It has been previously the custom to mount temperature responsive controlling means for the refrigerating means for the dough mixer wall in contact with the wall that is being cooled, so that the temperature of said wall controls the operation of said temperature responsive means. This is an extremely sensitive control.

Temperature changes in the wall will cause the thermostatic controlling device to be operated to halt the operation of the compressor when a predetermined low temperature of the wall has been reached, and upon the temperature of the wall rising again due to the heating action of the contents of the mixer, the circuit controlling the operation of the compressor is thereupon closed by the temperature responsive means on the wall of the dough mixer, setting the compressor in operation, if the usual pressure responsive means co-operating with said temperature responsive means is in circuit closing position, whereupon the temperature of the wall is again lowered to the point at which said temperature responsive controlling means again opens the circuit, this alternate opening and closing of the circuit being repeated several times during each period of operation of the dough mixer. While the temperature can be controlled within the closest limits in this manner, the frequent cycling of the compressor is sometimes found to be objectionable and this can be avoided by placing the temperature responsive controlling means as above set forth.

When said temperature responsive cooling means is placed with the bulb thereof in contact with the heat transfer medium, preferably, a liquid, the circuit will not be opened and closed frequently through said controlling means by slight temperature changes in the wall of the dough mixer, but the temperature of the heat transfer medium will lag somewhat behind the temperature of the dough mixer wall, the changes therein being only in accordance with relatively greater changes in the temperature of the dough mixer wall, thus keeping the compressor in operation continuously for a longer period of time during the mixing of each batch of dough, and making only one such period of operation of the compressor necessary ordinarily during each such mixing period. In practice, the dough mixer wall is kept at a low temperature between mixing operations, and ordinarily the temperature responsive control, when used in accordance with the present invention, is in an open circuit condition at the time mixing of dough commences. With the bulb of the temperature responsive controlling means in contact with the heat transfer medium provided as above mentioned the large body of said heat transfer medium will not immediately rise in temperature, as does the wall of the dough mixer when the warm dough comes in contact therewith, but will transfer heat from the dough mixer wall, keeping the temperature of the wall from rising as rapidly as would otherwise be the case, and the relatively large mass of heat transfer medium will gradually warm up until such a temperature is reached that the temperature responsive controlling means will close the circuit, provided of course, that the pressure responsive switching means is also in closed circuit position at that time. Thereupon the compressor will be set in operation and will continue to operate ordinarily through a large fraction of the time that the mixing operation continues, said compressor ordinarily being halted by the opening of the circuit through the controlling device responsive to the temperature of the heat transfer medium above referred to. Due to the fact that the dough mixer wall will be at a temperature approximately that of said heat transfer medium at the time said compressor is halted, and the mass of the cold heat transfer medium is so much greater than that of the wall in contact therewith, the heat transfer medium will ordinarily not again reach a temperature during said mixing operation that will cause the circuit to be closed through the temperature responsive controlling device, and accordingly the compressor will not ordinarily operate again during such mixing operation. In case it is again set in operation, such operation will continue long enough that no third period of operation of the compressor is ever found to be necessary.

While, preferably, a liquid heat transfer medium is provided around the cooling coil in a jacket that is provided on the outer face of the dough mixer wall that is to be cooled, it is only absolutely necessary that the heat transfer medium be in a liquid condition at a temperature at which it would be inserted in the jacket and that upon cooling thereof it will not expand so as to cause damage to the jacket. Thus a material could be used that would be in a liquid state at ordinary room temperatures or even at a temperature approximating the freezing point of water, which would solidify at or near the freezing point of water, or therebelow, and would ordinarily be solid at the temperatures at which the wall of the dough mixer and the cooling coil are kept during the operation of the device, as long as in solidifying said material would not expand.

The jacket is, preferably, provided with a fill opening at its uppermost point, which is left constantly open, so that in case my invention is applied to a dough mixer which is moved from one position to another and the heat transfer material remains in a liquid state while the refrigerating means is in operation, a hydraulic hammer will not be formed by said liquid upon tilting or otherwise moving the dough mixer bowl from one position to another.

Other objects and advantages of my invention will appear as the description of the drawings proceeds. I desire to have it understood, however, that I do not intend to limit myself to the particular details shown or described, except as defined in the claims.

Fig. 1 is a diagrammatic view showing my improved refrigerating means for a dough mixer.

Fig. 2 is a fragmentary view partly in elevation and partly in section, showing a portion of the jacket and expansion coil.

Fig. 3 is a vertical sectional view through a portion of the jacket, showing the preferred form of expansion coil used in carrying out my invention, and Fig. 4 is a view similar to Fig. 3 of a modification.

Referring in detail to the drawings, my improved refrigerating means for dough mixers is shown as being applied to a dough mixer 10, which is provided with an agitator 11 having beater arms 12, which may be of any desired character, rotating about a shaft 13 as an axis and causing the dough in the bowl of the mixer to be engaged with a wall 14 repeatedly as the mixing operation continues, said wall being cooled in a manner to be described below. While a type of dough mixer is shown in the drawing that has a movable wall 15 through which the contents of the mixer are discharged, any other type of mixer, such as the commonly provided types that tilt about the shaft 13 as an axis, can be cooled in a similar manner.

A conventional form of refrigerating system is illustrated, comprising a compressor 16 connected with a condenser 17 through a conduit 18, which in turn is connected with a receiver 19 through a conduit 20. The conduit 21 extends from the receiver to a manually operated control valve 22, from which the conduit 23 leads into the inlet end of an expansion coil through an expansion device 24. From the other end of said expansion coil a suction pipe, or return conduit 25 extends to the intake port of the compressor 16. An electro-magnetic valve 26 is, preferably, interposed in the suction pipe 25, as is also a T 27 for connecting a pressure responsive switch 28 with said suction line. The electro-magnetic switch 26 is of the type that is held in open position by means of a solenoid provided therein, when electrical energy is supplied thereto.

The dough mixer wall 14, preferably, has the expansion coil mounted directly thereon by providing transversely curved channel members 29 substantially semi-cylindrical in cross section thereon, said members being welded at their longitudinal edges to the outer face of the wall 14 at 30, so as to provide a liquid tight joint therebetween, thus providing a plurality of parallel refrigerant conduits 31 extending transversely of said wall, the adjacent conduits being connected together by means of connecting portions 32, as will be evident from Fig. 2, to provide a conduit following a circuitous path along said wall from the inlet end thereof to the conduit 33, which is similarly constructed to the lengths of conduit 31, but runs perpendicularly thereto, to provide a return conduit leading to the suction pipe 25 which is connected with the expansion coil at the discharge end thereof adjacent the inlet connection from the expansion valve 24. Said conduit 33 is spaced from the connecting portions 32 of the expansion coil, and the parallel runs or lengths 31 of the expansion coil are spaced from each other, as will be evident from Figs. 2 and 3.

Spaced from and extending substantially parallel to the wall 14 is a wall 34 of a jacket, which also has the side walls 35 and similar end walls 36 and 37 to provide a chamber in which the expansion coil is located, the expansion coil being spaced, however, from the walls thereof. Said walls of the jacket are provided with a covering 38 of heat insulating material, and said heat insulating material is, preferably, provided with a metallic covering or sheath 39 on the outside thereof. The chamber provided between the jacket and the wall 14 is filled with a heat transfer medium 40, which is indicated in the drawing as being liquid, and which is of a liquid character when filled into said chamber through a constantly open fill pipe 41 at the upper end thereof, a drain valve 42 being also provided for draining said heat transfer medium 40 from said chamber when this is desired.

Mounted on the jacket is an adjustable temperature responsive or thermostatic controlling device 43, which may be of any well known character, and is provided with a bulb 44, which extends through the walls 39 and 34 and the insulating material 38 into the chamber within the jacket in contact with the heat transfer medium 40. Said bulb is surrounded by a heat insulating sleeve 56 where the same passes through the walls 34 and 39 and the insulating material 38. The heat transfer medium fills the entire space within the jacket not occupied by the expansion coil, and in filling the chamber the same is, preferably, filled to the top thereof through the fill connection 41. However, in case said material should expand in the liquid state, or be caused to surge about in the chamber, due to movements of the dough mixer bowl, some of said heat transfer medium 40 may spill through said fill opening. This is not only not objectionable, but will result in a slight air space being provided in the uppermost end of the chamber, which will prevent any knocking or hammering action of the liquid 40 in case the bowl is moved from one position to another, thus avoiding any possibility of damage to the jacket because of such action of the liquid.

While the heat transfer medium 40 must be in a liquid state when inserted into the chamber, it does not necessarily have to remain in such a liquid state, but can be of such a character that it will thicken or even solidify at the temperatures which it reaches during operation of the device, as the only important feature thereof is that the same will transfer heat and will thoroughly fill the space within the chamber around the expansion coil and between the expansion coil and the walls of the jacket. However, if the material does solidify at such temperatures, it must be of a character that no expansion thereof will take place upon solidification thereof, as is the case of water or aqueous solutions. If aqueous solutions are used the same must be of such a character for the temperatures reached by the heat transfer medium 40, that the same will remain in a liquid state with a certain margin of safety allowed.

While the temperature responsive controlling device 43 can be utilized in any desired manner to control the operation of a refrigerating system so that refrigerant is supplied to the expansion coil whenever the temperature of the heat transfer medium 40 reaches a predetermined maximum, preferably, the arrangement shown in Fig. 1 is utilized. The thermostatic controlling means 43 may be of any well known character and is of the type that opens the circuit therethrough whenever the temperature of the medium with which the bulb 44 is in heat transfer relation reaches a pre-determined minimum, and closes the circuit therethrough whenever the temperature of the medium with which the bulb 44 is in heat transfer relation reaches a predetermined maximum. The controlling circuit shown in Fig. 1 comprises a pair of conductors 45 and 46 leading from a suitable source of electrical energy, which is not shown, the conductor 45 leading to the thermostatic control 43, a conductor 47 leading from said control to the electro-magnetic switch 26, and a conductor 48 leading from said electro-magnetic switch 26 to the pressure controlled switch 28. From said pressure controlled switch 28 a conductor 49 leads to a magnetic starter switch 50, said conductor 46 also leading to said switch 50. The closing of the circuit including the conductors 46 and 49 acts to close the magnetic starter switch 50 interposed between the line conductors 51 and the conductors 52 leading to the motor 53, which drives the compressor 16. A well known type of safety switch 54 is interposed in the line conductors 51 providing for manual opening of the motor circuit when it is desired to throw the apparatus entirely out of operation.

The supply of refrigerant to the expansion coil can be either controlled through the magnetically operated valve 26 or the manually operated valve 22. If the manually operated valve 22 is only utilized, then the electro-magnetic switch 26 is omitted from the system, and the conductors 47 and 48 are directly connected with each other.

Whether the electro-magnetically operated switch 26 is provided or not, the compressor 16 will be operated only when the thermostatically operated or temperature controlled switching means 43 is closed and the pressure actuated switch 28 is also closed. The switch 28 is of any well known character, provided in refrigerating systems, which operates to close the circuit therethrough whenever the pressure in the suction line 25 at the intake connection to the compressor 16 reaches a predetermined maximum and opens whenever said pressure in said suction line reaches a predetermined minimum. However, the switch 28 will not serve to operate the compressor unless the thermostatically controlled switch 43 is also closed, due to the fact that the temperature of the heat transfer medium 40 has reached a predetermined maximum. Accordingly, said pressure controlled switch and said temperature responsive switch 43 cooperate to control the operation of the rotor 53 which drives the compressor 16. In practice, when a batch of dough has been placed in the mixer to be operated on, the compressor 16 will be started upon closing of the switches 28 and 43 after a predetermined rise in temperature of the heat transfer medium 40 has taken place, and the pressure responsive switch 28 will ordinarily not halt the operation of the compressor 16 due to opening thereof, but when the heat transfer medium 40 reaches a predetermined minimum temperature the controlling circuit will be opened and the compressor 16 will be halted. Closing of the circuit will ordinarily not again occur until after the mixing operation has been completed, when, during a time that the mixer is not in use, there may be a period of closing of the circuit to bring the mixer wall up to the temperature at which it is kept while said mixer is empty. The electro-magnetically operated valve 26 will, of course, be opened when the controlling circuit is closed, so as to open the suction pipe 25 and permit withdrawal of refrigerant by means of the compressor 16 from the expansion coil. If the valve 26 is not provided, then the suction line will be constantly open and the withdrawal of refrigerant will be controlled entirely by the operation of the compressor. If it is desired to entirely shut off the supply of refrigerant to the expansion coil the manually operated valve 22 is utilized for this purpose.

Instead of providing an expansion coil of the character shown in Fig. 3, an expansion coil made up of pipe 29' can be provided, as shown in Fig. 4, the expansion coil in this case being provided with means for mounting the same between the jacket wall and the dough mixer wall 14, such as the spacing members 55 and the heat transfer medium 40 completely surrounding the expansion coil when an expansion coil of this character is provided. The expansion coil in the form of the invention shown in Fig. 4 is not in direct heat transfer relation to the dough mixer wall, but heat transfer is accomplished through the heat transfer medium 40.

What I claim is:

1. In a dough mixer, a mixing chamber, rotatable beater arms in said mixing chamber for contacting dough with a wall of said chamber, and means for cooling said wall comprising a jacket on the outer face of said wall, a liquid heat transfer medium confined in said jacket, a cooling coil within said jacket in engagement with said heat transfer medium, a compressor, a condenser, a receiver, conduit means connecting said coil, compressor, condenser and receiver in series in a closed circuit, and temperature responsive means controlling the operation of said compressor, having a temperature responsive controlling element extending into said jacket, said temperature responsive element being located in said liquid heat transfer medium remote from said wall and being exposed only thereto, said heat transfer medium being principally in heat transfer relation to said coil and wall.

2. In a dough mixer, a mixing chamber, rotatable beater arms in said mixing chamber for contacting dough with a wall of said chamber, and means for cooling said wall comprising a jacket on the outer face of said wall, a heat transfer medium confined in said jacket, a cooling coil substantially coextensive with said wall mounted on said wall in heat transfer relation thereto and within said jacket in engagement with said heat transfer medium, a compressor, a condenser, a receiver, conduit means connecting said coil, compressor, condenser and receiver in series in a closed circuit, and temperature responsive means controlling the operation of said compressor, having a temperature responsive controlling element extending into said jacket and exposed to said heat transfer medium therein, said heat transfer medium being principally in heat transfer relation to said coil and wall.

3. In a dough mixer, a mixing chamber, rotatable beater arms in said mixing chamber for contacting dough with a wall of said chamber, and means for cooling said wall comprising a jacket on the outer face of said wall, a liquid heat transfer medium confined in said jacket, a cooling coil within said jacket surrounded by said heat transfer medium, a compressor, a condenser, a receiver, conduit means connecting said coil, compressor, condenser and receiver in series in a closed circuit, and temperature responsive means controlling the operation of said compressor, having a temperature responsive controlling element extending into said jacket, said temperature responsive element being located in said liquid heat transfer medium remote from said wall and being exposed only thereto, said heat transfer medium being principally in heat transfer relation to said coil and wall.

4. In a dough mixer, a mixing chamber, rotatable beater arms in said mixing chamber for contacting dough with a wall of said chamber, and means for cooling said wall comprising a jacket on the outer face of said wall, an expansion coil in said jacket mounted on said wall, a liquid heat transfer medium filling the space within said jacket around said coil, and in heat transfer relation principally with said coil and wall means for supplying and withdrawing refrigerant from said coil, and a thermostatic control for said last mentioned means responsive to the temperature of said medium mounted in said liquid heat transfer medium in spaced relation to said wall and coil.

MERLIN A. STICELBER.

REFERENCES CITED

The following references are of record in the file of this patent:

UNITED STATES PATENTS

| Number | Name | Date |
|---|---|---|
| 1,699,576 | Wolverton | Jan. 22, 1929 |
| 2,219,789 | Potter | Oct. 29, 1940 |
| 2,274,220 | Sticelber | Feb. 24, 1942 |
| 2,323,354 | Rees | July 6, 1943 |